Sept. 1, 1970 J. L. MICHAELIS 3,526,808
ELECTRIC ARC STABILIZING MEANS
Filed Feb. 7, 1968 3 Sheets-Sheet 1

INVENTOR
JOHN L. MICHAELIS

BY *Chisholm and Spencer*

ATTORNEYS

INVENTOR
JOHN L. MICHAELIS

BY Chisholm and Spencer
ATTORNEY

United States Patent Office 3,526,808
Patented Sept. 1, 1970

3,526,808
ELECTRIC ARC STABILIZING MEANS
John L. Michaelis, Pittsburgh, Pa., assignor to PPG Industries, Inc., Pittsburgh, Pa., a corporation of Pennsylvania
Filed Feb. 7, 1968, Ser. No. 703,601
Int. Cl. H05b 41/16
U.S. Cl. 315—282     18 Claims

ABSTRACT OF THE DISCLOSURE

Disclosed herein are various circuits for stabilizing plasma arcs and preventing arc runaway. By using a balancing transformer in series with a power supply, two or more arcs connected in parallel, and preferably a sufficient amount of impedance to render the overall impedance of the circuit positive, any fluctuation in current within the arcs may be balanced and thus controlled. Through the use of a slightly more elaborate circuit, the intensity of the arcs may be varied and controlled without loss of stability. Such a circuit preferably includes a variable saturable core-two winding reactor connected between a balancing transformer and a control transformer which is connected in parallel with one of the arcs.

BACKGROUND OF THE INVENTION

This invention relates to electric arcs and stabilizing circuits therefor. More specifically, this invention relates to novel stabilizing circuits for electric arcs which do not require high power losses to achieve stabilization.

Electric arcs in general, and plasma arcs more specifically, are inherently unstable in their electrical behavior. This problem of instability may be attributed primarily to the fact that an electric arc exhibits a negative resistance characteristic. Because of this negative resistance any change or fluctuation of current within an electric arc circuit causes a large, and opposite change in voltage. In turn, any change in voltage causes additional instability which further increases the change in current. This self-propagating situation is well known and is generally referred to as arc "runaway."

Current fluctuations which cause runaway in arcs are quite prevalent and are usually attributed to certain physical and chemical phenomena that occur at the sites of the arcs. Such fluctuations are especially pronounced when the electric arcs used are plasma arc devices, since in these devices gases at speeds greater than that of sound are being forced through and heated in the arc tubes. Temperature fluctuations, eddy currents, and general turbulance of these gases all serve to affect the stability of the arcs.

Many attempts have been made in the prior art to stabilize arcs of this type, primarily through the use of a series resistor or impedance in the circuit external to the arc. Such an impedance, if sufficiently large, will override the effect of the negative arc resistance, and will produce an overall arc circuit impedance that is positive, whereby a fluctuation in voltage causes a corresponding, not opposite, current change.

Although the prior art systems which add such impedances to arc circuits can achieve good arc stability when properly constructed, they are extremely uneconomical, for there is a tremendous power loss associated with the use of series impedances. For example, some large power plasma arcs which have recently been built use resistors to provide stability for a direct current arc. Such resistors continuously absorb as much as 50% of the total power input to the system. This 50% power loss doubles the already high cost of power and, in addition, doubles the cost of the required power supply equipment. When alternating current arcs are involved or when rectified alternating current is used to supply a D.C. arc, reactances are usually used instead of resistors. Such systems typically operate at a power factor of from 18% to 40%, which again materially increases the cost of input power and equipment by requiring excessive capacity in the power supply and additional equipment for power factor correction.

SUMMARY OF THE INVENTION

This invention overcomes the difficulties of prior plasma arc supply systems by providing balancing means which may be used either alone or in combination with prior stabilizing means to stabilize electric arcs and prevent their runaway with great savings in equipment costs and required power. The use of such a balancing means permits in the formation of unique series circuits for stabilizing and controlling electric arcs. Basically, these unique circuits comprise a source of power, electric arc means containing at least two electric arcs coupled in parallel with each other, and balancing means located between the power source and the electric arc means to force a current division between the arcs.

In a preferred form, the balancing means is an inductor having a pair of windings with a one to one turns ratio, the electric source being connected to the junction of the two windings and the other ends of the windings being connected to corresponding arcs. Due to the instability characteristics of plasma gas arcs, such arcs may be further stabilized by using balancing means in combination with such well known stabilizing means as impedances etc. In many instances, stabilizing circuits provided with this combination have been found to require only one-fourth of the impedance required by previous circuits having the same degree of stability, but not using the balancing circuit.

BRIEF DESCRIPTION OF THE DRAWINGS

The various objects, features and advantages of the present invention will be appreciated from the following detailed description of preferred embodiments thereof, selected for purposes of illustration and shown in the accompanying drawings, in which.

DETAILED DESCRIPTION OF THE INVENTION INCLUDING SOME PREFERRED EMBODIMENTS

Figure 1:
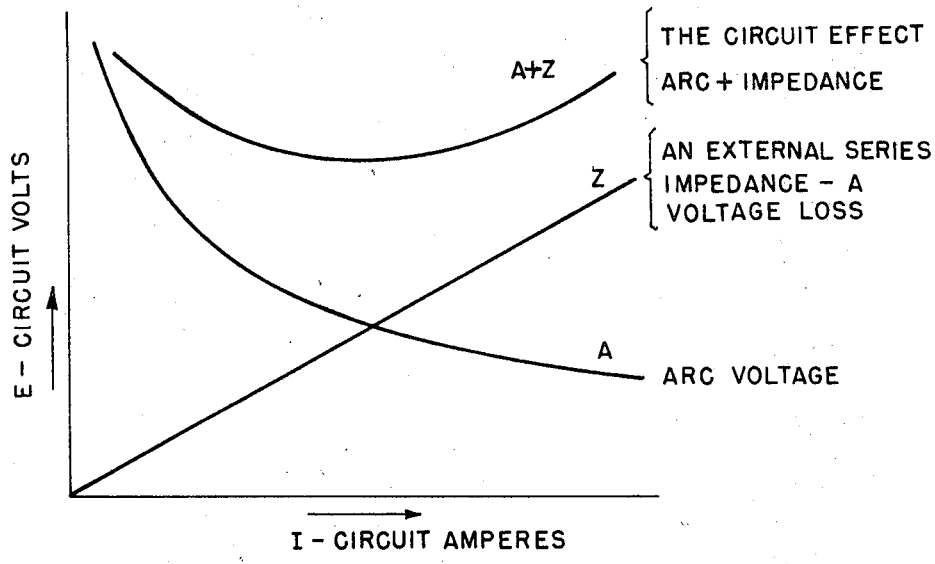
FIG. 1 is a textbook description of the voltage and current behavior of an electric arc alone or in series with an impedance.

Referring now to the chart of FIG. 1, curve A is illustrative of the current-voltage relationship in a typical plasma arc device. This curve, which may be obtained by measurement of the voltage drop across the current through a plasma arc, exhibits a slope which is characteristic of negative resistance devices; that is, a decrease in voltage results in an increase in current, and vice versa. A positive resistance value is depicted in conventional manner by curve Z, which is illustrative of the generally linear voltage and current relationship of an impedance. When such an impedance is connected in series circuit with a plasma arc device, but external to the arc, the characteristics of the arc and the impedance become additive, producing a resultant circuit characteristic such as that indicated by the curve $A+Z$ in FIG. 1. By making the external impedance sufficiently large, the total circuit characteristic may thus be changed from negative to positive, and this can prevent runaway in an arc device.

As was indicated above, the prior art has recognized that such a positive impedance characteristic can be obtained in an arc circuit through the addition of series impedances, but as also mentioned, such impedances must be quite large in order to provide sufficient resistance to produce a positive characteristic. The present invention recognizes the fact that by connecting two arcs in parallel, one of relatively low resistance and having a negative resistance characteristic such as that indicated in curve A and, the other having a relatively high resistance through the use of a series impedance which will give a positive resistance characteristic such as that indicated in curve $A+Z$, and by connecting these two arcs through a balancing transformer, or inductor, as will be described, improved stability of both arcs can be achieved.

Figure 2:
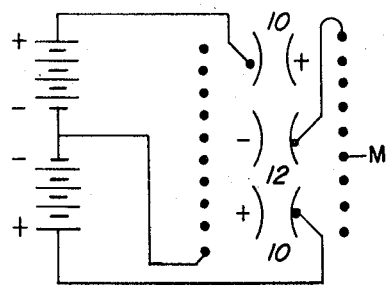
FIG. 2 is a diagrammatic illustration of a circuit connection for rotating an electric arc.
Figure 3:
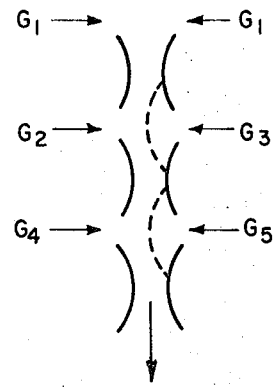
FIG. 3 depicts a typical plasma arc device wherein the arrows set out the direction of flow of the gases that are heated.

FIG. 2 diagrammatically illustrates a typical electric arc plasma gas device operated from direct current battery sources and including a pair of positive arc electrodes 10 and a negative arc electrode 12. The application of DC power as indicated causes electric arcs to flow between adjacent electrodes to heat gases flowing through the center of the electrodes. Although not shown in this illustration, the electrodes typically may be annular in shape. To prevent deterioration of the electrodes by the arcs, a magnetic field is provided by means of an external coil M which surrounds the electrodes and exerts a rotational force on the arc current. This causes the arcs to move around the electrodes instead of remaining stationary, and thus extends the electrode life, as is well known in the plasma device art. FIG. 3 is an illustration of the manner in which gases to be heated by the electric arcs may be fed into the interior of the arc device. Thus, gas may be introduced at the end of the electrode array, as indicated at $G_1$, or may be introduced into the device between adjacent electrodes, as indicated at $G_2$, $G_3$, $G_4$ and $G_5$, to permit different amounts of gas to be fed to the two arcs. The heated and ionized plasma gas exits from the device at the lower end of the arc array, as indicated by an arrow.

For many electric arcs which are relatively stable by nature and exhibit only small and infrequent current fluctuations, adequate arc stability and control may be achieved through the use of a series circuit which basically comprises a source of power, electric arc means which include at least two electric arcs coupled in parallel with each other, and balancing means located between the source of power and the electric arc means to force a current division between the electric arcs, without the use of a series impedance. Examples of electric arcs which are inherently stable enough to be balanced in this way are the well-known pulsed power supply metal transfer electric arcs used for welding, such as seam welding devices.

The above-described circuits achieve arc stability by the forced coupling of at least two unstable arcs which, through action and reaction to unstable occurrences, tend to restabilize themselves. Such corrective stabilization resulting from the mutual inductance between the parallel arc circuits, by reason of the balancing means described herein, is automatic and extremely effective. One way in which stabilization through forced coupling may be achieved through the circuits contemplated by this invention is to provide for an equal current division by the balancing means in order to provide equal current to each arc.

Figure 4:
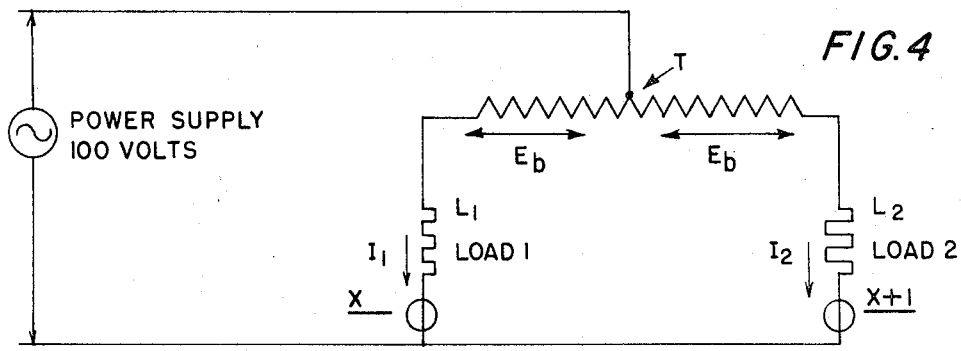
FIG. 4 is a diagrammatic illustration of a circuit wherein equal current may be forced between two resistive loads.

FIG. 4 illustrates how equal current may be forced by a balancing means into two resistive loads having as large as a 50 to 1 ratio. In this circuit $L_1$ is a resistance load of 50 ohms, $L_2$ is a resistance load of 1 ohm, and T is a two winding balancing transformer having a 1 to 1 turns ratio. The transformer windings are connected to each other at one end, with the junction being connected to one side of the power source. The transformer is, in effect, a center-tapped inductor, with the outer ends of the windings being connected to corresponding load resistors. Equal back E.M.F.'s $E_b$ are induced in each winding by the difference in current between the two windings of the transformer caused by the unequal loads, and simple calculations reveal that equal currents $I_1$ and $I_2$ will be forced across each load. For example with a power supply voltage of 100 volts, the following values can be calculated:

$$I_1 = \frac{100+E_b}{50}$$

$$I_2 = \frac{100-E_b}{1}$$

Since $I_1 = I_2$, then $$\frac{100+E_b}{50} = \frac{100-E_b}{1}$$

$$100+E_b = 50(100-E_b) = 5000-50E_b$$

$$51E_b = 4900$$

$$E_b = 96.1$$

Therefore, $$I_1 = \frac{100+96.1}{50} = 3.9 \text{ amps.}$$

and $$I_2 = \frac{100-96.1}{1} = 3.9 \text{ amps.}$$

Therefore, with a back E.M.F. of 96.1 volts in the two windings of the transformer, equal currents through the unequal load resistors $L_1$ and $L_2$ will be provided.

If in FIG. 4, electric arcs are substituted for $L_1$ and $L_2$, and a turns ratio of 1 to 1 in the transformer is assumed, it can be seen that any fluctuation in current $\Delta i$ due to arc instability will effect a corresponding correctional back E.M.F. in the transformer. This correctional E.M.F. then changes the voltage division across the windings of the transformer in such a direction that the current to one load tends to increase and the current to the other tends to decrease, to force equal currents through the arcs and stabilize them against runaway.

Although the above-described basic circuit is useful for providing adequate insurance against runaway of inherently stable electric arcs, the greatest industrial benefits of this invention are realized when a balancing means (i.e. the above basic circuit) is used in combination with one or more of the well known prior art stabilizing means to stabilize, at a lower power loss, an inherently unstable arc system. Examples of these prior art stabilizing means include such devices as impedances, phase delay silicon controlled rectifiers, gaseous discharge rectifiers such as thyratrons, or other devices which "chop" or modulate a power supply (e.g. a 60 cycle power supply).

As will be appreciated, each of these prior art stabilizing means produces a power loss when used in a circuit. Such a power loss becomes extremely high when these devices are used alone to stabilize plasma gas electric arcs due to, if nothing else, the sheer size and number of them that must be used to achieve adequate stability of these inherently unstable arcs. For example, a typical plasma arc run at an intensity of 910 volts and 100 amps (i.e. an arc resistance of 9.1 ohms) was found to require an additional 28 ohms, provided by a series reactor external to the arc, in order to insure adequate arc stability. Such a system was found to require a power source voltage of 2940 volts in order to supply the arc load of 910 volts at 100 amperes. This represents a 69% loss of power or, stated another way, only 31% of the input energy was used to actually operate the arc. High power and parts costs obviously result from such a power loss factor. No better results are achieved if modulating devices are used in place of impedances, since in almost all instances modulating devices, within all practical ranges of modulation, are ineffective to insure adequate arc stability.

Lower power costs and more economic use of plasma arcs may now be achieved, as alluded to above, through one form of this invention which basically comprises a combination of the above-described basic series circuit with the well-known prior art impedance devices. By using appropriate circuitry hereinafter exemplified, balancing means are used to complement the prior art impedance devices and thus effect a material reduction in the amount of impedance required to achieve arc stability. In many instances the reduction factor is as high as 4/1.

The novel combined circuit contemplated by this invention generally comprises a series connection which includes a power source, an impedance means unbalanced, electric arc means which comprise at least two electric arcs coupled in parallel with each other, and balancing means located between the source of power and the electric arc means to force a current division between the electric arcs.

Impedance means used in this circuit may be of any known and suitable type. The amount of impedance used or required will, of course, depend upon the type of arcs to be stabilized and the degree of stabilization desired. It has been found, however, that for highly unstable electric arcs generally, and almost all plasma arcs more specifically, the amount of impedance required, though reduced significantly over prior art requirements, must still be sufficient such that the overall impedance of the arc circuit in which the impedance is located is positive. Such a condition assures adequate stability for most industrial processes with a high degree of protection against runaway.

Balancing means contemplated for use in this invention may assume many forms and types. For example, any form of mutually coupled coils may be adapted so as to achieve arc stability, since correctional E.M.F. is a feature of mutual coupling. In a preferred form, however, the mutually coupled coils or balancing means are transformers and more specifically are conventional two winding transformers. The windings of these transformers may be provided with turns ratios of 1 to 1 so as to provide an equal current division between the coupled arcs. An example of such a transformer is a standard 440—440 volt two winding A.C. transformer. These transformers may also be provided with variable taps or other adjustment means in order to permit establishment of a balancing ratio which differs from unity to thereby provide a current balance at a preselected ratio other than unity between the coupled arcs. Such a non-unity balance provides two important services hereinafter more fully discussed.

No matter what type of mutually coupled coil system or balancing means is chosen, it is necessary to provide a balancing means which is large enough to create sufficient counteracting or correcting E.M.F. to stabilize the arc current and prevent runaway. In practice it is found that if the balancing means is designed so that a 1% fluctuation or change in arc current, $\Delta i$, results in a 5% or greater change in voltage as a counteracting or correcting force, such a balancing means will in most instances adequately stabilize electrical arcs generally and plasma arcs more specifically. When balancing means, such as for example, standard two-winding A.C. transformers are designed in this way and used in a series circuit as hereinbefore described, a stability is imparted to the arc means which is completely automatic and does not impose any substantial added reactive or resistive load on the input power circuit. For example, if a standard 60 cycle power transformer is used, its total losses are in the order of 1% of kva. rating. This loss may be compared to the 69% loss due to the addition of conventional series stabilizing impedances alone, as discussed above.

Conventional power sources may be used to provide input power to the stabilizing circuit. For example, the power source may be either single phase or three phase and of any convenient frequency. The arcs themselves may be either direct current arcs or alternating current arcs. In the instances where A.C. power is used as the input and a D.C. arc is desired, rectifiers will be used to achieve this result. Rectifiers suitable for use in this invention are well known to the art, examples of which may be found in applicant's U.S. Pat. No. Re. 25,000 issued June 20, 1961. In this respect, it is seen that the specific type of rectifiers used, as well as all other elements of the various circuits described herein, will be chosen in accordance with the type and frequency of the input power source. Such a choice, once given the teachings of this invention, is well within the capabilities of the ordinary artisan.

Although specific types of arcs have been referred to hereinabove, it may be generally stated that almost all conventional electric arcs such as heating, lighting, and basic welding arcs may be stabilized by this technique. As already discussed, a preferred arc contemplated for use herein is a plasma arc, since this type of arc exhibits an extremely high tendency toward instability and thus is able to reap more fully the advantages of this invention. Plasma arcs are well known in the art and as shown schematically in FIG. 3 generally comprise a series of electrodes through which a gas is forced at speeds exceeding the speed fo sound. The arcs are formed between internal surfaces of the electrodes and heat the gases rushing therethrough to extremely high temperatures. Some general examples of these arcs are the Von Koch Arc (U.S. Pat. No. 1,115,625) and the Linde Arc manufactured by Union Carbide.

Although the above-described circuits work well when using a power source which is not itself subject to fluctuations, in practice, the power source used is usually a commercial power source supplied by an independent producer. Such commercial power is subject to fluctuations since, in most instances, many other consumers are tapping the same source. For this reason it has been found very beneficial to utilize a voltage regulator means between the power source and the balancing means in order to insure a stable or constant input power supply. Voltage regulators which may be used for this purpose are conventional in the art, an example of which is a standard induction type stepless voltage regulator having a range of plus or minus 33%.

In many instances it is either required or desirable to be able to change and control the intensities of the arcs. Two exemplary instances which occur frequently during industrial use of electric arcs are: (1) where each arc must be run at a different intensity or energy level and (2) where two dis-similar arcs must be run at equal intensities or energy levels. Dis-similar arcs, it should be noted, frequently occur due to the inability to build two arcs exactly alike.

This invention, in order to meet the above-discussed industrial needs, provides, in addition to the balancing means, control means for varying the intensities of the arcs. Although such control means may assume many different forms, one preferred means is the balancing transformer having variable taps or other adjustment means as hereinbefore described. Such a variable transformer may be provided with a plurality of taps which permit adjustment of current balance to a value other than unity. Another control means contemplated by this invention is a variable reactor, such as a well-known saturable core, two winding reactor provided with a D.C. winding to change the overall impedance of the reactor. Such a control means is connected in series between the balancing means and the arc means in the above-described circuits of this invention. Still another preferred control means consists of a control transformer provided with a plurality of taps and located in place of the above-described reactor means or in parallel with one of the arcs.

An especially preferred embodiment for controlling arc intensities, and one which has proven extremely useful, is a combination of a variable reactor means with a control transformer. Such a combination effects a very stable and highly accurate control of the arc intensity. Control means of this type are preferably inserted in the circuit so that one terminal of the reactor is connected to the balancing means, the other terminal being connected to the control transformer, and the control transformer being connected in parallel with at least one of the arcs.

The above-described basic series circuits and novel combination circuits of this invention may assume many forms and be of many types. The following examples are the best modes or types contemplated by the inventor for embodying his invention and are illustrative rather than limiting.

Figure 5:
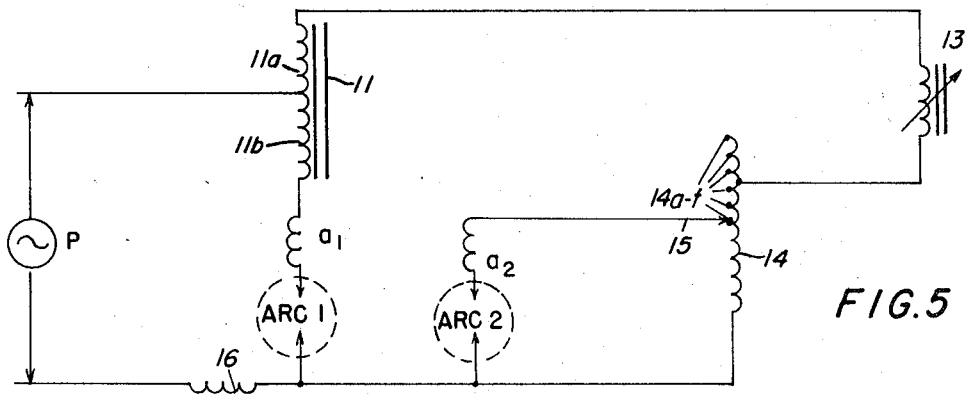
FIG. 5 is a schematic illustration of one circuit contemplated by this invention for stabilizing electric arcs.

FIG. 5 illustrates one preferred series circuit for stabilizing two electric arcs (e.g. plasma gas arcs). Basically this circuit includes a power source with voltage regulator represented at P, connected at one terminal to a balancing transformer 11 having windings 11a and 11b with a turns ratio of 1 to 1. One end of winding 11a of balancing transformer 11 is connected to a variable reactor 13, while one end of winding 11b is connected to a high frequency air core reactor $a_1$ which is in series connection with Arc 1. Reactor 13 is coupled by its output terminal to the input terminal of a variable or control transformer 14 having taps 14a, b, c, d, e and f. Such taps may have values such as 95%, 97%, 99%, 101%, 103% and 105% respectively and they may provide for a ±10% ratio change in the voltage applied to Arc 2. The variable tap 15 of transformer 14 is connected through a second high frequency air core reactor $a_2$ to one electrode of Arc 2. The other side of this arc is connected to the remaining terminal of transformer 14, whereby the transformer, or a major portion thereof, depending upon the position of tap 15, is in parallel with the arc air core reactor $a_2$. The arcs are connected as shown to arc rotation means generally depicted at 16, corresponding to coil M of FIG. 2. High frequency air core reactors $a_1$ and $a_2$ are used in the circuit to provide added stability when Arcs 1 and 2 are being run at high frequency levels, but add little or no reactance to the system at normal frequencies..

Under normal operating conditions of this circuit, where the two parallel arcs are deliberately unbalanced so as to produce substantially different loads, the current through the respective arcs will be in static equilibrium. Should a current fluctuation in one or both of the arcs occur, the reactor 13 which provides one of the arcs with a positive resistance characteristic, complemented by balancing transformer 11, which initiates a correctional E.M.F. to overcome the fluctuations, will serve to stabilize the arcs and prevent runaway. In this respect it is noted that in many instances reactor 13 may actually be from ½ to ¼ of the size that would normally be required to prevent runaway if balancing transformer 11 were not present in the circuit. When using plasma arcs, reactor 13 should provide sufficient impedance so as to render the overall impedance of the circuit positive.

The following operating conditions, though by no means critical, illustrate the advantages of the above described circuit of FIG. 5. If variable reactor 13 is set to provide 16 ohms of impedance so that the circuit of Arc 2 has a substantially higher impedance than that of the circuit of Arc 1, the operating characteristics of a typical arc device at normal frequencies, as determined from measurements taken from an operative plasma arc device, with Arc 1 operating with a negative resistance characteristic and Arc 2 operating with a positive resistance characteristic by reason of the variable reactor, will be as follows:

| Arc current | Arc voltage | |
|---|---|---|
| | Arc 1 | Arc 2+16 ohms |
| 90 amperes | 940 | 1,720 |
| 100 amperes | 910 | 1,840 |
| 110 amperes | 888 | 1,969 |

If the two arcs each carry 100 amperes, the average voltage across the two is 1375 volts, and in a perfectly balanced load system this voltage would appear across each arc. However, the present system is purposely unbalanced, whereby at 100 amperes a voltage of 910 volts will appear across Arc 1, while a voltage of 1840 volts will be required for Arc 2 plus the reactor, although, as has been explained, the currents remain equal in each arc. A sudden change or fluctuation from 100 amperes to 90 amperes in one of the arcs will cause a transient or short time instability, but, due to the mutual inductance in the 1 to 1 ratio balancing transformer, counter-E.M.F.'s will be generated which will tend to force each arc to 90 amperes, or to equal values as hereinabove discussed. In addition to this corrective stabilizing effect, the circuit design forces another correctional effect. For example, when Arc 1 fluctuates from 100 to 90 amperes, its voltage fluctuates from 910 to 940 volts, as seen from the above chart, or a change of +3.3%. Arc 2, likewise, has its voltage changed from 1840 to 1720 volts or a change of −6.5%. The average relative change is therefore $$\frac{940+1720}{910+1840}=\frac{2660}{2750}=3.27\%$$

which represents extra voltage available to force a corrective action to thereby increase each of the two currents above the 90 ampere level toward a stable operating point close to the original level of 100 amperes. Similarly, if the arc current increases above the normal level, there will be a difference in percentage changes from the average values which will tend to force the arc currents downwardly toward stability.

Thus it can be seen from this example that the above circuits of this invention provide a means whereby two or more unstable arcs are, by being coupled together, forced to stability by the substantially simultaneous action and reaction of the arcs to an unstable condition. This example further illustrates how two arcs may be stabilized using only a 16 ohm reactor. As described hereinabove, previous circuits without the balancing means of this invention and having only one arc required 28 ohms or more impedance to attain the same degree of stability. Savings in power and parts are therefore clearly apparent.

Figure 6:
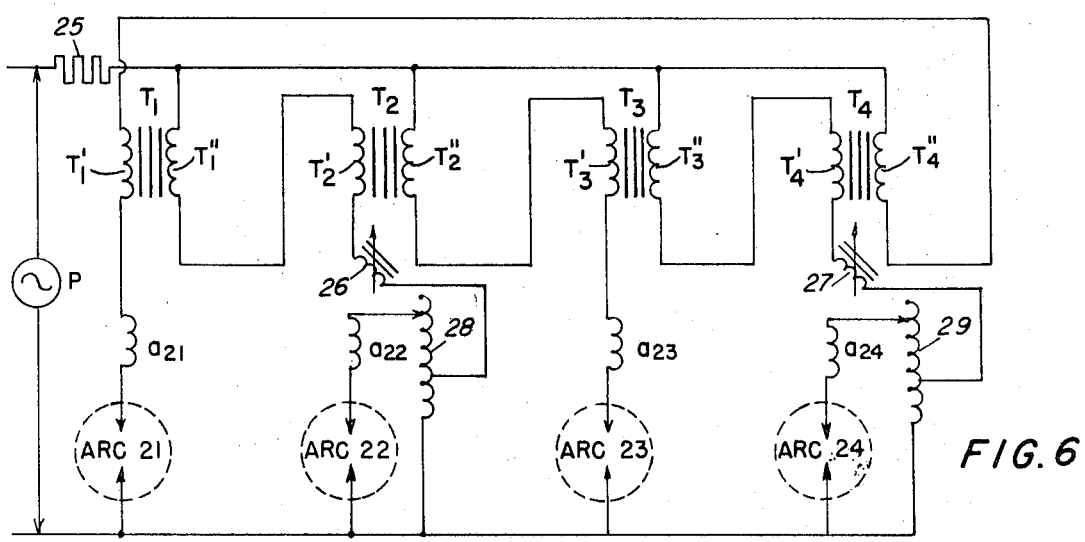
FIG. 6 is a schematic illustration depicting one embodiment for stabilizing more than two electric arcs.

FIG. 6 depicts another preferred form which this invention may assume. This figure schematically illustrates one way in which more than two arcs may be coupled together so that fluctuations in the arcs will be forced to stability by the correcting factors of the circuit. As in the above described two-arc circuit, the forced coupling of more than two unstable actions creates stability by the action and reaction of the various Arcs 21, 22, 23 and 24 and their balancing means $T_1$, $T_2$, $T_3$ and $T_4$. This circuit, which for convenience can be called a loop circuit, is provided with a power supply and voltage regulator means P, a power source impedance 25, and preferably, high frequency air core reactances $a_2$, $a_{22}$, $a_{23}$ and $a_{24}$ connected in series with corresponding Arcs 21–24 for better stability at high frequencies.

Each of the balancing transformers $T_1$ through $T_4$ includes a pair of windings, identified, for example, as $T_1'$ and $T_1''$ having the one to one turns ratio of the balancing means previously described. Each arc is inductively interconnected with the adjacent arcs on both sides so that the several arcs react to each other in the manner described with respect to FIG. 5 to maintain current equilibrium. Thus, winding $T_1''$ is connected in a series arc circuit with winding $T_2'$, with a variable reactor 26, corresponding to reactor 13 of FIG. 5, and a control transformer 28, corresponding to transformer 14 of the embodiment of FIG. 5. The variable tap on control transformer 28 is connected through air core reactor $a_{22}$ to Arc 22, and the series arc circuit is connected across the power source.

Winding $T_2''$ is connected in a series circuit which includes winding $T_3'$, air core reactor $a_{23}$ and Arc 23 across the power supply P. Winding $T_3''$ is connected in series with winding $T_4'$, a variable reactor 27 and a control transformer 29 across the power supply P, with the variable tap on control transformer 29 being connected through air core reactor $a_{24}$ and Arc 24 in parallel with transformer 29. Winding $T_4''$ is connected in series with winding $T_1'$, air core reactor $a_{21}$ and Arc 21 across the power supply P. It will be seen from the foregoing structure that variations in the arc current of any one of Arcs 21 through 24 will affect the current flow through its two adjacent arcs, and through a complex relationship of mutual inductances will tend to stabilize such variations and prevent arc runaway. It will be understood that although the control transformers 28 and 29 are illustrated in connection with Arcs 22 and 24, they could also be provided on all four arcs, or on only one arc, with much the same effect, because of the interrelationship between the four arcs.

Figure 7:
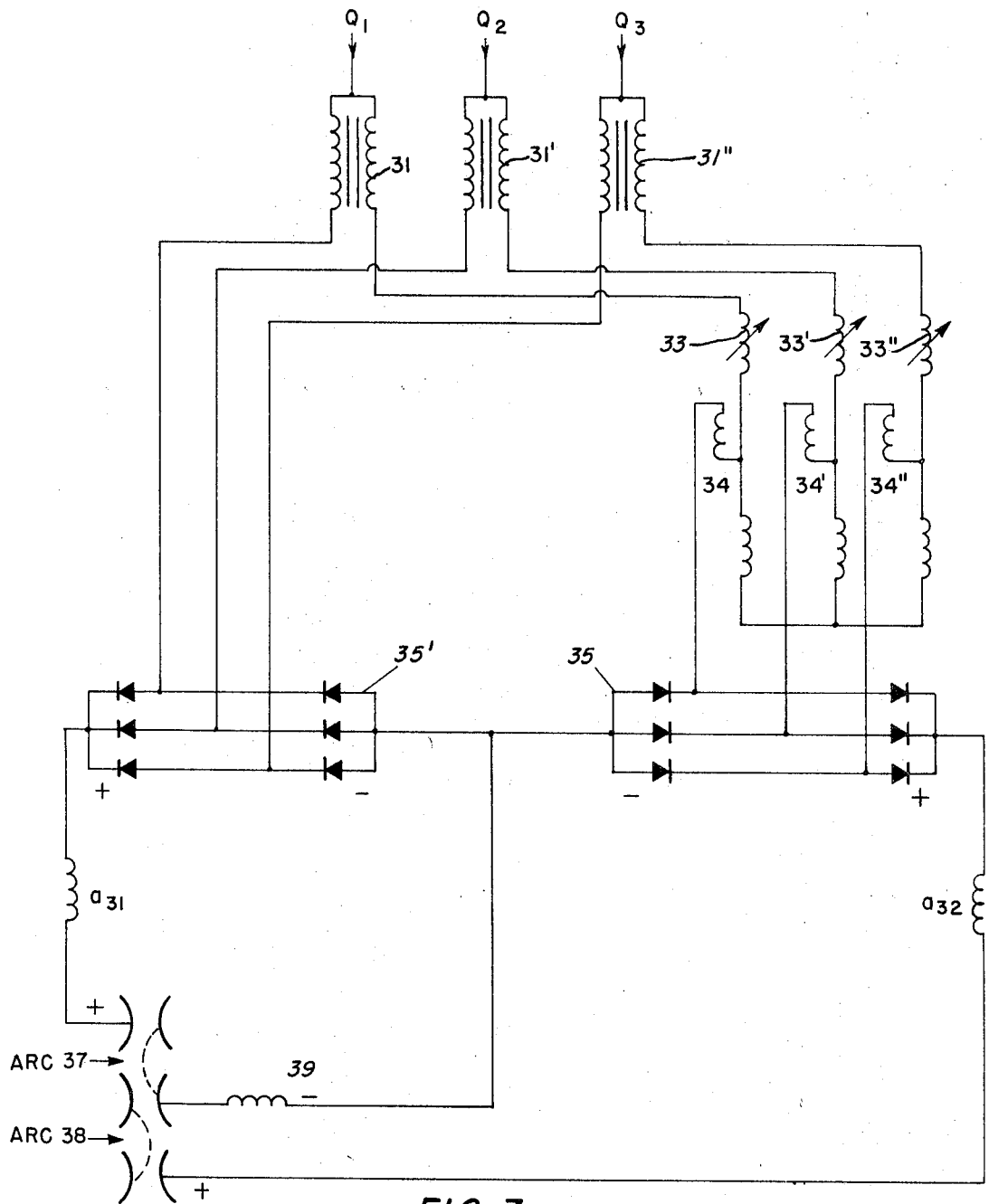
FIG. 7 is a schematic illustration of a preferred embodiment for stabilizing electric arcs when three-phase power is being used.

FIG. 7 generally illustrates the circuit of this invention (as described with respect to FIG. 5) adapted for a three phase A.C. input power supply which is rectified to supply D.C. plasma gas arcs. Three phase A.C. power supply input lines $Q_1$, $Q_2$, $Q_3$ are connected, preferably through voltage regulator means of known type, to the center of balancing transformers 31, 31', and 31'', respectively, one winding of each transformer being connected to the corresponding variable reactors 33, 33', and 33''. These variable reactors are, in turn, connected in series with tapped control transformers 34, 34', and 34'', three phase rectifiers 35, and Arc 38. The other windings of the balancing transformers are connected through three phase rectifier 35' to Arc 37. The circuit may also be appropriately provided with air-core reactors $a_{31}$ and $a_{32}$ in series with Arcs 37 and 38, respectively, for high frequency operation and a conventional arc rotating coil, generally depicted at 39, may also be included in the circuit, if desired.

The circuit of FIG. 7 operates in substantially the same manner as that of FIG. 5, with the current fluctuations in Arcs 37 and 38 effecting back E.M.F. variations in balancing transformers 31, 31' and 31'' by way of the three phase rectifiers 35 and 35'. The variable reactors 33, 33' and 33'' and the corresponding control transformers 34, 34' and 34'' all operate on their respective phase currents in substantially the manner of the device of FIG. 5, and their effects are combined to regulate Arc 38. It will be understood that the load relationships represented by Arcs 1 and 2 in FIG. 5 are similarly present in Arcs 37 and 38 of FIG. 7.

The above, detailed description and preferred embodiments clearly point out various useful modes of making and using circuits for achieving economic electric arc stability and preventing arc runaway. Once given this description and preferred embodiments many modifications and other embodiments of this invention will become obvious and thus are included within its scope.

I claim:

1. In an electric arc stabilization circuit, a source of power, first and second electric arcs having substantially different load impedances, inductive balancing means connecting said first and second arcs in parallel circuits across said source of power, and impedance means connected in series with only one of said first and second arc circuits, whereby said arc circuits are unbalanced, said balancing means maintaining equal currents through said arc circuits.

2. The arc stabilization circuit of claim 1, wherein said inductive balancing means includes a pair of mutually coupled coils.

3. The arc stabilization circuit of claim 2, wherein said mutually coupled coils have a one-to-one turns ratio.

4. The arc stabilization circuit of claim 3, wherein said electric arcs are plasma gas arcs.

5. The arc stabilization circuit of claim 1, further including a variable control transformer in circuit with said impedance means in said one of said arc circuits.

6. The arc stabilization circuit of claim 5, wherein at least a portion of the winding of said control transformer is in parallel with the arc of said one of said arc circuits.

7. The arc stabilization circuit of claim 6, wherein said impedance means is variable.

8. The arc stabilization circuit of claim 7, further including an air core reactor in series with the arc in each of said arc circuits.

9. The arc stabilization circuit of claim 7, wherein said inductive balancing means includes a pair of mutually coupled coils.

10. The arc stabilization circuit of claim 9, wherein said coils comprise two windings having a one-to-one turns ratio.

11. A circuit for stabilization and control of electric arcs, comprising, a source of alternating current power, first and second electric arcs, balancing means connecting said first and second electric arcs in parallel circuits across said source of power, and rectifier means between said balancing means and said first and second arc circuits for delivering direct current to said arcs.

12. The circuit of claim 11, further including a control means for regulating the intensity of said arcs.

13. The circuit of claim 12, wherein said control means includes a variable transformer connected in parallel with at least one of said arcs.

14. The circuit of claim 13, further including variable impedance means connected in series with only one of said parallel circuits.

15. The circuit of claim 11, further including impedance means connected in one of said parallel circuits.

16. In an electric arc stabilization circuit, a source of power and at least three electric arcs connected in a loop circuit with said source, said loop circuit including a balancing transformer for each arc, each balancing transformer having first and second windings, and each arc being connected across said source of power by way of an arc circuit including the first winding of its corresponding balancing transformer and the second winding of an adjacent balancing transformer, whereby each arc circuit is inductively coupled to the circuit of both its adjacent arcs, thereby to stabilize all of said arcs.

17. The stabilization circuit of claim 16, further including a variable impedance in at least one of said arc circuits.

18. The stabilization circuit of claim 17, further including a variable control transformer in at least one of said arc circuits.

References Cited

UNITED STATES PATENTS

| | | | |
|---|---|---|---|
| 2,382,012 | 8/1945 | Keiser | 315—258 X |
| 2,659,034 | 11/1953 | Hall | 315—297 X |

RAYMOND F. HOSSFELD, Primary Examiner

U.S. Cl. X.R.

315—258, 294, 297

PO-1050
(5/69)

UNITED STATES PATENT OFFICE
CERTIFICATE OF CORRECTION

Patent No. 3,526,808            Dated September 1, 1970

Inventor(s)    John L. Michaelis

It is certified that error appears in the above-identified patent and that said Letters Patent are hereby corrected as shown below:

Claim 10, line 31, column 10, after "windings" insert
---of a transformer, said windings---.

SIGNED AND
SEALED
NOV 17 1970

(SEAL)
Attest:

Edward M. Fletcher, Jr.
Attesting Officer

WILLIAM E. SCHUYLER, JR.
Commissioner of Patents